W. C. BANKS.
Seed-Planter.
No. 295. A. I. Patented Sept. 4, 1860.
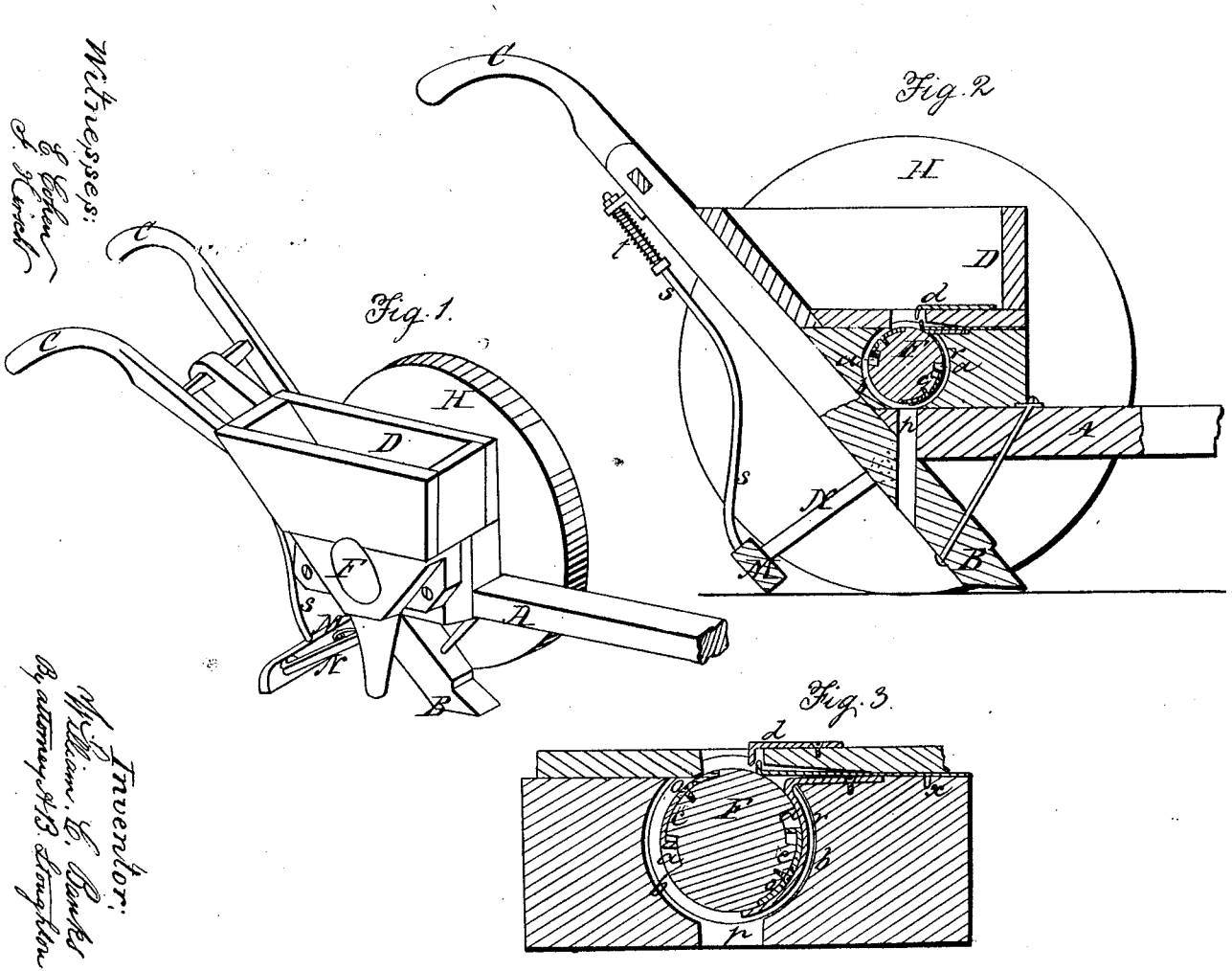
Witnesses:
E. Cohen
J. Hirsch
Inventor:
William C. Banks
By attorney A. B. Stoughton
N. PETERS, PHOTO-LITHOGRAPHER, WASHINGTON, D. C.

Search Room

222. DISPENSING.
338

UNITED STATES PATENT OFFICE.

WILLIAM C. BANKS, OF COMO DEPOT, MISSISSIPPI.

IMPROVEMENT IN CORN-PLANTERS.

Specification forming part of Letters Patent No. 28,051, dated May 1, 1860; Additional Improvement No. 295, dated September 4, 1860.

*To all whom it may concern:*

Be it known that I, WM. C. BANKS, of Como Depot, Mississippi, have invented certain new and useful Improvements in Corn-Planters, of which the following is a specification.

The additional improvement which I have made and desire to have added to my original patent consists in a holding device to be used in connection with the parts heretofore claimed and patented by me on the 1st of May, 1860; and that my improvement may be readily understood I have lettered the accompanying drawings, Figures 1′, 2′, 3′, to correspond with those on the original patent, so that the former description will fully explain the addition I now make to that patent.

In my machine as at first constructed the charge of seed in the cells *a* would drop out before the cell arrived at the opening or seed-conductor *p*, which caused irregular planting; and to remedy this defect I have applied a spring-holder, *r*, which surrounds that portion of the seeding-wheel F that is between the hopper inlet and the exit at *p*, which entirely prevents the seed from leaving its cell *a* until the cell arrives at or over the opening or duct *p*, whence it drops to the ground. I have found by practice, too, though do not claim it as an invention, that in some plantings the speed of the main wheel H is not sufficient to give the requisite speed to the seeding-wheel F. In such case I use gearing of any ordinary kind between said wheels that will give an accelerated motion to the seeding-wheel F. I propose, too, to apply a spring-scraper at the rear of the machine for smoothing down the furrow and leveling the earth over the planted seeds.

M is the scraper; N, the arms by which it is connected to the plow stalk or frame, and *s* is a rod running up to near the handles, where it is restrained by a spiral or other spring, *t*, against which the scraper rises to accommodate itself to the inequalities of the ground.

What I claim, and desire to add to my patent of the 1st of May, 1860, is—

In connection with the seeding-wheel F, with its flanges *b*, spring-clearer *d*, and adjusting device *c*, as therein claimed, the spring-holder *r*, surrounding a portion of the seeding-wheel, to prevent the seeds from dropping from the cells until said cells arrive at or over the exit-openings, as herein fully set forth and represented.

WM. C. BANKS.

Witnesses:
A. B. STOUGHTON,
E. COHEN.